US010032011B2

(12) United States Patent
Kao (10) Patent No.: US 10,032,011 B2
(45) Date of Patent: Jul. 24, 2018

(54) METHOD AND DEVICE FOR MANAGING AUTHENTICATION USING AN IDENTITY AVATAR (71) Applicant: AT&T Intellectual Property I, LP, Atlanta, GA (US)

(72) Inventor: Frank Kao, Palo Alto, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 18 days.

(21) Appl. No.: 14/457,675

(22) Filed: Aug. 12, 2014

(65) Prior Publication Data
US 2016/0048667 A1 Feb. 18, 2016

(51) Int. Cl.
G06F 21/32 (2013.01)
G06F 21/33 (2013.01)
(Continued)

(52) U.S. Cl.
CPC .............. G06F 21/32 (2013.01); G06F 21/33 (2013.01); G06F 21/62 (2013.01); H04L 63/0861 (2013.01)

(58) Field of Classification Search
CPC .......... G06F 21/32; G06F 21/62; G06F 21/33; H04L 63/0861
See application file for complete search history.

(56) References Cited

U.S. PATENT DOCUMENTS 7,054,811 B2   5/2006   Barzilay
7,545,962 B2   6/2009   Peirce et al.
(Continued)

FOREIGN PATENT DOCUMENTS

CN        1554165 A      12/2004
KR      20020031675       5/2002
(Continued)

OTHER PUBLICATIONS

Janes, Ricardo et al., "A study on the available biometric technologies used in order to control security in physical access", WSEAS Transactions on Systems and Control 5.6 (2010): 393-402.
(Continued)

Primary Examiner — Beemnet Dada
Assistant Examiner — Stephen Gundry
(74) Attorney, Agent, or Firm — Scott P. Zimmerman, PLLC (57) ABSTRACT Aspects of the subject disclosure may include, for example, generating a digital certificate responsive to an authentication of a user according to a dynamic biometric process, associating the digital certificate with a transaction record for the transaction, storing information associated with authentication conditions of the dynamic biometric process, receiving an access request associated with the transaction, and providing access to the transaction record, the information associated with the authentication conditions of the dynamic biometric process or a combination thereof responsive to the access request, where granting of the access is according to transmitting an access acknowledgement to equipment of the user, or obtaining another authentication to allow permission to access or a combination thereof. Other embodiments are disclosed.

20 Claims, 6 Drawing Sheets (51) Int. Cl.
  *G06F 21/62* (2013.01)
  *H04L 29/06* (2006.01)

(56) References Cited

U.S. PATENT DOCUMENTS

| | | | |
|---|---|---|---|
| 8,006,291 B2 | 8/2011 | Headley et al. | |
| 8,296,562 B2* | 10/2012 | Williams | H04L 63/0838 713/155 |
| 8,468,358 B2 | 6/2013 | Headley | |
| 8,478,990 B2 | 7/2013 | Brown et al. | |
| 8,479,007 B2* | 7/2013 | Tame | G07B 1/00 713/178 |
| 8,536,976 B2* | 9/2013 | Headley | G06F 21/316 340/5.2 |
| 8,613,066 B1 | 12/2013 | Brezinski et al. | |
| 8,712,802 B1 | 4/2014 | Griffin, Jr. | |
| 8,769,621 B2 | 7/2014 | Wechsler et al. | |
| 9,064,257 B2* | 6/2015 | Beigi | G06Q 20/3223 |
| 9,098,850 B2* | 8/2015 | Weiner | H04W 12/06 |
| 9,191,382 B1* | 11/2015 | Hornung | H04L 9/3226 |
| 9,450,760 B2* | 9/2016 | Lindemann | H04L 63/0861 |
| 9,673,986 B2* | 6/2017 | Webb | H04L 9/3263 |
| 2003/0046083 A1 | 3/2003 | Devinney, Jr. et al. | |
| 2003/0163739 A1* | 8/2003 | Armington | G06F 21/32 726/3 |
| 2004/0010698 A1* | 1/2004 | Rolfe | H04L 63/0823 713/186 |
| 2004/0049687 A1 | 3/2004 | Orsini et al. | |
| 2005/0063522 A1 | 3/2005 | Kim et al. | |
| 2005/0165700 A1 | 7/2005 | Karthik | |
| 2007/0005988 A1* | 1/2007 | Zhang | G06F 21/32 713/186 |
| 2008/0052527 A1 | 2/2008 | Siedlarz | |
| 2008/0229119 A1* | 9/2008 | Skoric | G11B 20/00086 713/193 |
| 2008/0250477 A1* | 10/2008 | Samuelsson | H04L 9/321 726/4 |
| 2008/0256613 A1* | 10/2008 | Grover | G06F 21/32 726/5 |
| 2009/0025071 A1* | 1/2009 | Mumm | G06F 21/32 726/7 |
| 2009/0164796 A1 | 6/2009 | Peirce | |
| 2009/0259848 A1* | 10/2009 | Williams | H04L 63/0838 713/168 |
| 2010/0046806 A1 | 2/2010 | Baughman et al. | |
| 2010/0088233 A1 | 4/2010 | Tattan et al. | |
| 2010/0106502 A1 | 4/2010 | Farrell et al. | |
| 2010/0125737 A1* | 5/2010 | Kang | G06Q 20/12 713/176 |
| 2011/0088090 A1* | 4/2011 | O'Brien | G06F 21/10 726/19 |
| 2011/0246196 A1* | 10/2011 | Bhaskaran | G10L 17/24 704/235 |
| 2012/0110341 A1* | 5/2012 | Beigi | G06Q 20/3223 713/186 |
| 2012/0124651 A1* | 5/2012 | Ganesan | G06F 21/31 726/4 |
| 2013/0036462 A1 | 2/2013 | Krishnamurthi | |
| 2013/0133049 A1* | 5/2013 | Peirce | G06F 21/32 726/6 |
| 2013/0160100 A1* | 6/2013 | Langley | H04L 63/126 726/7 |
| 2013/0205135 A1* | 8/2013 | Lutz | G06F 21/6245 713/165 |
| 2013/0205380 A1* | 8/2013 | Avni | H04L 63/0853 726/7 |
| 2013/0225128 A1* | 8/2013 | Gomar | H04W 12/06 455/411 |
| 2013/0225129 A1* | 8/2013 | Norbisrath | G06F 21/32 455/411 |
| 2013/0326223 A1* | 12/2013 | Webb | H04L 9/0825 713/171 |
| 2013/0340028 A1* | 12/2013 | Rajagopal | H04L 63/08 726/1 |
| 2014/0013405 A1* | 1/2014 | White | H04L 63/0861 726/5 |
| 2014/0157384 A1* | 6/2014 | Stern | G06F 21/32 726/7 |
| 2014/0172430 A1* | 6/2014 | Rutherford | G06Q 20/20 704/273 |
| 2014/0222678 A1* | 8/2014 | Sheets | G06Q 20/40145 705/44 |
| 2014/0289117 A1* | 9/2014 | Baghdasaryan | G06Q 20/42 705/44 |
| 2014/0289528 A1* | 9/2014 | Baghdasaryan | G06Q 20/42 713/171 |
| 2014/0298011 A1* | 10/2014 | Ganesan | G06F 21/31 713/159 |
| 2014/0333415 A1* | 11/2014 | Kursun | G06F 21/32 340/5.83 |
| 2014/0372128 A1* | 12/2014 | Sheets | G06Q 20/40145 704/273 |
| 2014/0379342 A1* | 12/2014 | Li | G06Q 20/40145 704/246 |
| 2015/0035643 A1* | 2/2015 | Kursun | G07C 9/00134 340/5.52 |
| 2015/0040247 A1* | 2/2015 | Skoric | G11B 20/00876 726/30 |
| 2015/0046711 A1* | 2/2015 | Slaby | H04L 63/08 713/170 |
| 2015/0046996 A1* | 2/2015 | Slaby | H04L 63/08 726/7 |
| 2015/0128240 A1* | 5/2015 | Richards | H04L 63/0861 726/7 |
| 2015/0187359 A1* | 7/2015 | Bhaskaran | G10L 17/24 704/235 |
| 2015/0278820 A1* | 10/2015 | Meadows | G06Q 20/40145 705/64 |
| 2015/0294313 A1* | 10/2015 | Kamal | G06Q 20/401 705/44 |
| 2015/0312041 A1* | 10/2015 | Choi | H04L 9/3231 713/175 |
| 2015/0317626 A1* | 11/2015 | Ran | G06Q 20/3821 705/76 |
| 2015/0319170 A1* | 11/2015 | Grossemy | G06F 21/31 713/186 |
| 2015/0347734 A1* | 12/2015 | Beigi | G06F 21/32 713/155 |
| 2016/0012427 A1* | 1/2016 | Van Heerden | H04L 63/0853 705/44 |
| 2016/0050199 A1* | 2/2016 | Ganesan | G06F 21/31 726/7 |
| 2016/0127904 A1* | 5/2016 | Ward | H04L 63/0442 713/176 |
| 2016/0219043 A1* | 7/2016 | Blanke | H04L 9/3263 |
| 2016/0241403 A1* | 8/2016 | Lindemann | H04L 63/0861 |
| 2016/0241552 A1* | 8/2016 | Lindemann | G06F 21/32 |
| 2016/0353282 A1* | 12/2016 | Richards | H04L 63/0861 |
| 2017/0103758 A1* | 4/2017 | Bhaskaran | G10L 17/08 |

FOREIGN PATENT DOCUMENTS

| | | |
|---|---|---|
| WO | 2008127316 A1 | 10/2008 |
| WO | 2013124455 A1 | 8/2013 |

OTHER PUBLICATIONS

Jayamaha, R. et al., "VoizLock-Human Voice Authentication System using Hidden Markov Model." Information and Automation for Sustainability, 2008. ICIAFS 2008. 4th International Conference on. IEEE, 2008, (Abstract), IEEE Xplore Digital Library. [Retrieved on May 28, 2014]. Retrieved from the Internet <URL:http://ieeexplore.ieee.org/xpl/login.jsp?tp=&arnumber=4783977&url=http%3A%2F%2Fieeexplore.ieee.org%2Fxpls%2Fabs_all.jsp%3Farnumber%3D4783977>.

Lupu, C. et al., "Multimodal biometrics for access control in an intelligent car", Computational Intelligence and Intelligent Informatics, 2007. ISCIII'07. International Symposium on. IEEE, 2007.

(56) References Cited

OTHER PUBLICATIONS (Abstract), IEEE Xplore Digital Library. [Retrieved on May 28, 2014]. Retrieved from the Internet <URL:http://ieeexplore.ieee.org/xpl/login.jsp?tp=&arnumber=4218432&url=http%3A%2F%2Fieeexplore.ieee.org%2Fxpls%2Fabs_all.jsp%3Farnumber%304218432>.

* cited by examiner

METHOD AND DEVICE FOR MANAGING AUTHENTICATION USING AN IDENTITY AVATAR

FIELD OF THE DISCLOSURE

The subject disclosure relates to a method and device for managing cyber space authentication using an identity avatar.

BACKGROUND

Electronic devices are being utilized with more frequency in transactions including purchases of products and services, as well as entering various agreements with other parties. Parties to these transactions desire to have confidence of the identity of the other parties to the transaction, as well as confidence that any information being provided to another device is being done securely to avoid unauthorized users from participating in the transaction or accessing the information.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for authentication of transactions through a multi-factored biometric verification. One or more of the exemplary embodiments provide for generation of a digital certificate via the authentication process where the digital certificate can be associated with a specific transaction record so that "SPECIFIC AUTHENTICATION and ACCESS (access rights, who, where, when, how)" information for the authentication can be accessed and retained for future tracking and legal documentation.

A digital certificate can be generated and utilized to act as a "pad-lock" to whatever information it is associated with, e.g., transaction records, signed documents and so forth. In one embodiment, when a user opens the document or uses software to lookup a transaction record, a message is sent over to the identify avatar, which (based on the information stored within the certificate) will ether: a) log the request, and allow opening the transaction, or b) initiate a two-factored voice biometric authentication request to the user (i.e., the person that signed the transaction) for access to the underlying sensitive information that it is trying to protect. This example provides a feedback loop to allow the user to have knowledge and a traceable record of who and where the private information is being consumed.

One or more of the exemplary embodiments provide for a digital certificate being issued after the user's identity has been absolutely identified, and enables a "full legal representation" of the user in cyber space. One or more of the exemplary embodiments provide a dynamic authentication (e.g., via voice being used as a dynamic biometric), as opposed to other authentication processes that are static and can be duplicated. Each digital certificate can be used to trace back to the original authentication conditions when issuing. The digital certificate can be embedded along with the document and with a "user-defined" desire access control acknowledgement to the creator. In one or more embodiments, after document release, document access can be controlled by the "digital certificate" either by requiring the creator to acknowledge and allow the access via "full authentication" to allow the "reader" to access, or by an acknowledgement sent to the user indicating the document has been accessed. One or more of the exemplary embodiments, provides a method and/or system for the user to control and acknowledge who and where the documents have been released to. A cyber identity avatar can be utilized to track these accesses and can store them into a storage vault, such as for future analysis. Other embodiments are described in the subject disclosure.

One or more of the exemplary embodiments enable use of multi-factor, dynamic voice biometric data as a personal digital signature to protect against any unauthorized internet transactions. The transactions can be of various types including purchases (e.g., products or services), access to media services, agreements between parties, and so forth. One or more of the exemplary embodiments can utilize a personal avatar (e.g., a network-based and/or end-user device-based persistent personal avatar) for administering the authentication process, such as training of a biometric model, monitoring for user transactions, obtaining of user input for the authentication, providing access to authentication data via a generated digital certificate, and so forth. For example, a cyber identity avatar can oversee or otherwise monitor all or some of a user's internet transactions and can verify the user's identity prior to certifying any pending web-based transactions.

One or more of the exemplary embodiments can enable a digital certificate to be issued or otherwise generated as the result of a positive identification of the user, where the digital certificate can be stored along with a digitally signed document or event (e.g. a transactional record that is then associated with the digital certificate). As an example the digital certificate can include a matrix barcode (e.g., a Quick Response (QR) Code® which is a registered trademark of Denso Corp.). In one or more exemplary embodiments, the digital certificate, such as the matrix barcode can be used to trace back to stored authentication and/or transaction records, such as one or more of a voice print or other biometric data or analysis, a time, a date, identification information for a device used for the transaction and/or used for the authentication, identification information for the communication session used for the authentication and/or transaction, a description of the transaction, negotiation data (e.g., bids, selected and/or non-selected options for the transaction) associated with the transaction, and so forth. For example, the authentication and/or transaction records can be stored in a storage device (e.g., a database or an electronic storage vault) in a central and/or distributed fashion.

One or more of the exemplary embodiments of the digital certificate issued to provide "acknowledgement" to a user via the multi-factor authentication process allow user knowledge of who and where the transaction record is being accessed and used. For example, after a transaction has been recorded for a document, such as a real estate transaction that includes private sensitive information such as social security numbers, and residence address, any access to the document will trigger a request to the Cyber Identify Avatar requesting the original creator to authenticate him/herself, and by doing so, acknowledge the source of the entity accessing the document.

In one or more exemplary embodiments, a user can setup or otherwise adjust his or her personal cyber identity avatar. During this process, the user can train or otherwise provision the avatar for generating a voice biometric model that can be subsequently utilized in performing a voice biometric authentication of the user. For example, the user can be prompted to and can speak a pre-determined set of words or sentences that are utilized in generating the user's voice print model. In one or more embodiments, the user can designate a personal communication device (e.g., a mobile phone) that can be used for identity verification purposes (e.g., providing a multi-factor authentication via user input at the designated communication device). The designation of the communication device can be a single device or can be multiple devices (such as based on presence information and/or a prioritization of devices).

In one or more exemplary embodiments, the cyber identity avatar can use voice print dynamically spoken at the time of request as the biometric authentication factor, and can then use the user's designated mobile phone as a second factor for identity verification. In this example, the voice biometric is dynamic since the user can speak different words or different sentences than the words or sentences used to train the avatar during the setup. For instance, the user can speak a completely different set of words from the set of words used to train the avatar during the setup or can speak different sentences that may or may not have some of the same words with respect to the sentences used to train the avatar during the setup. For instance, the user upon receiving a voice call on a designated communication device from the cyber identity avatar can speak the prompted sentences to the avatar for voice print match to verify identity. In one or more exemplary embodiments, the prompted sentences utilized for subsequent authentication are different to avoid a non-authorized user from obtaining and utilizing a recording of the authorized user's sentences in a fraudulent attempt at authentication.

One or more of the exemplary embodiments can provide a persistent avatar that monitors the user's transactions on the internet, and responds to requests for the user to verify identity when required by each transaction. For example, the transaction is allowed only if all the authentication factors are satisfied. The authentication factors include authentication via a specific designated mobile device, and authentication via a dynamic voice pattern that matches the user's pre-stored voice print model. In this example, after the user's identity is verified, then a digital certificate is issued. This digital certificate captures the specific user identification event and can be embedded or otherwise associated with a digital transaction document. The digital certificate can be used to trace back to all or some of the biometric data used for the transaction and authentication.

One embodiment of the subject disclosure is a method to use the digital certificate to control the access to the particular document that it is associated with. The user needs to satisfy the multi-factored authentication requirements before gaining access to the document. This method allows the user to continue to control the access to the document after it has been released.

One embodiment of the subject disclosure includes a machine-readable storage medium, comprising executable instructions that, when executed by a server, facilitate performance of operations, including providing a request for first user input to enable generating a biometric model for a user. The server can store the biometric model and can obtain a designation of a communication device of the user for use with authentication of transactions of the user. The server can detect a transaction associated with the user and can provide a request for the user to provide second user input via the communication device responsive to the detecting of the transaction. The server can receive the second user input via the communication device and can perform a voice biometric analysis by comparing the second user input with the stored voice biometric model for authentication of the user. The server can generate a digital certificate responsive to the authentication and can associate the digital certificate with a transaction record for the transaction. The server can receive a request for an authentication verification associated with the transaction and can provide access to data representative of the biometric analysis responsive to the request for the authentication verification.

Figure 1:
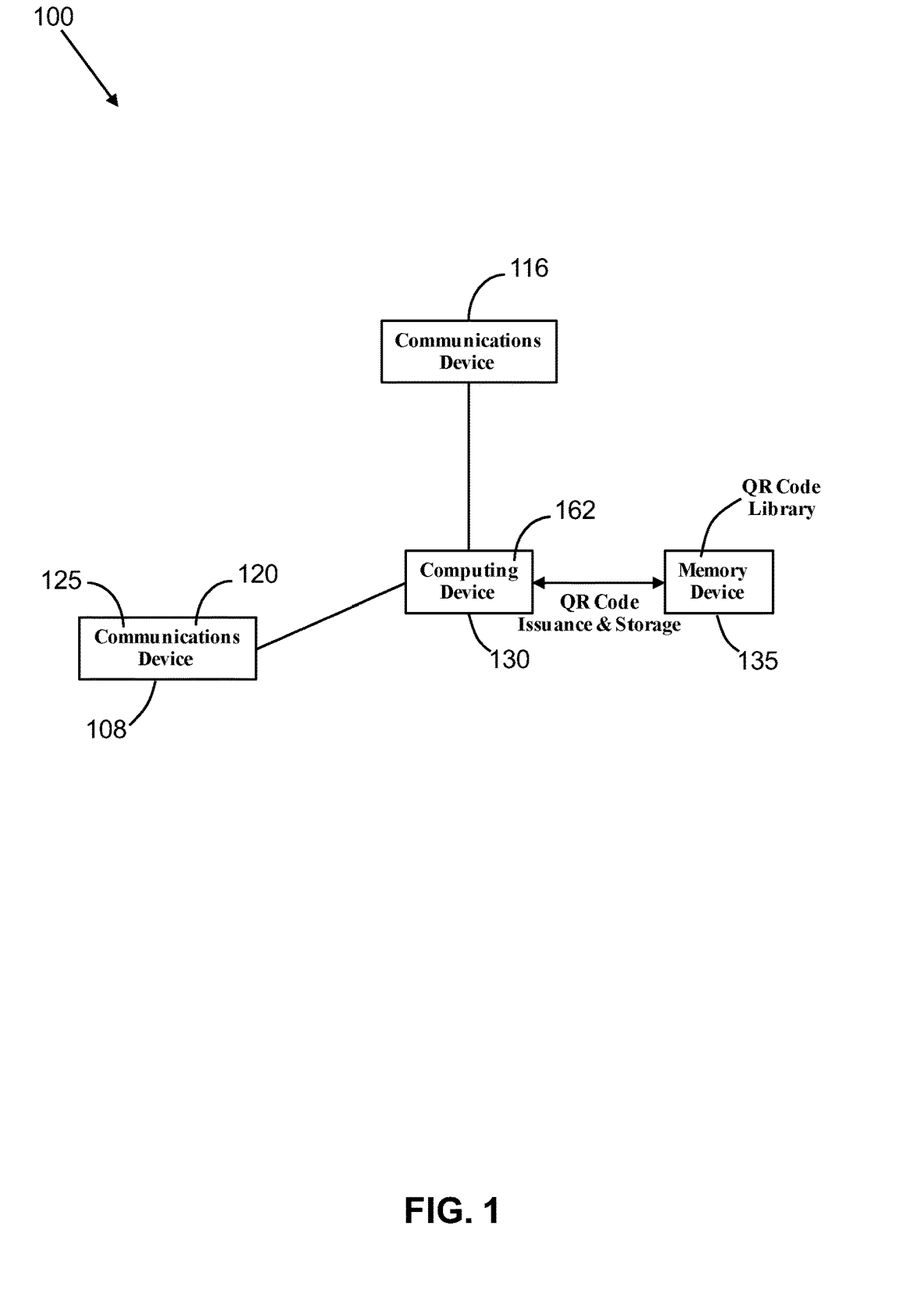
FIG. 1 depicts an illustrative embodiment of a system that provides authentication of transactions through a multi-factored biometric verification.

FIG. 1 depicts an illustrative embodiment of a system 100 that provides authentication of transactions through a multi-factored voice biometric verification, such as voice print analysis. One or more of the exemplary embodiments provide for generation of a digital certificate via the authentication process where the digital certificate can be associated with (e.g., embedded in) a transaction record so that information for the authentication and/or transaction can be later accessed. One or more of the exemplary embodiments provide a process where the digital certificate can allow the user to control the release of the document by asking for user authentication prior to user access.

System 100 can include various devices that enable communication over a network, including wireless and/or wired communications. The communications can be of various types including voice, video data and/or messaging. System 100 can include communication devices 108 and 116, a computing device 130, and a memory device 135. As an example, communication device 108 can be a first device such as a desk-top computer, a lap-top computer, a mobile device, a set top box, an interactive television, a residential gateway, a server, a vehicle computing system, a personal digital assistant, or any other device or end user device that enables transactions via communications with other devices. As another example, communication device 116 can be a second device such as a desk-top computer, a lap-top computer, a mobile device, a set top box, an interactive television, a residential gateway, a server, a vehicle computing system, a personal digital assistant, or any other device or end user device that enables obtaining user input for multi-factor authentication of transactions. As yet another example, computing device 130 can be a third device such as a server, a desk-top computer, a lap-top computer, a mobile device, a set top box, an interactive television, a residential gateway, a vehicle computing system, a personal digital assistant, or any other device or end user device that enables management of a multi-factor authentication process for transactions, such as via an avatar. As a further example, memory device 135 can be one or more servers, database devices or any other device(s) or end user device(s) that enable storage of information associated with authentication of transactions through a multi-factored biometric verification.

For instance, a user can engage in a communication session with a server 130 via computer 108 (or another device). The communication session can be associated with a transaction and can be of various types including voice, video, data and/or messaging which can utilize various communication protocols over wireless and/or wired connections. For instance, the transaction can be one that requires obtaining or submitting a document that has been or needs to be notarized. The transaction can also be for the purchase of products or services. The type of transaction can vary and can include various communication exchanges in which multiple parties reach an agreement. In this example, the server 130 can detect or otherwise determine that a user authentication can be performed to facilitate the transaction. For instance, the server 130 can be executing a personal avatar 162 that monitors user transactions, such as across various end user devices of the user. This can be performed in a number of different ways, including registering the end user devices with the personal avatar 162 to facilitate the monitoring. In other embodiments, the end user devices can include software that enables or requires the end user device to provide information regarding impending transactions to the personal avatar 162 so that the monitoring can be performed. Other techniques for monitoring by the personal avatar 162 of one or more end user devices of the user can also be utilized. This example describes use of a personal avatar 162 which can communicate with the user for obtaining user input utilized in the multi-factor authentication process. The personal avatar 162 can take on various forms, such as a customized voice in a voice call that prompts the user for user input, a customized graphical avatar that requests the user input, or other forms which may or may not be customized.

In one embodiment, the personal avatar 162 can detect the transaction and can call the user's designated communication device 116 (e.g., a mobile phone) to obtain the user input. For instance, the voice call from the personal avatar 162 can request that the user speak selected (e.g., randomly or otherwise) sentences for performing a voice match. If the personal avatar 162 determines a voice biometric match, then the avatar generates or otherwise issues a digital certificate 120 for the authentication. For example, the personal avatar 162 can provide the digital certificate 120 to a requesting party to provide notice that the transaction has been authorized, where the digital certificate represents the user's digital representation for signing a document or record 125 associated with the transaction. The digital certificate also includes information for third party document access control, such as requiring the document creator to either grant access permission via full authentication, or simply notifying creator of the document access. In this example, the digital certificate 120 along with the document 125 can be stored together at the memory device 135 and can represent the user's legal authentication of the document signed. The memory device 135 which can be a separate server(s) or which can be integrated with server 130 can also store other information associated with the transaction and/or authentication, including one or more of a voice print or other biometric data or analysis, biometric model(s) for the user, a time/date of the authentication and/or transaction, identification information for a device used for the transaction and/or used for the authentication, identification information for the communication session used for the authentication and/or transaction, a description of the transaction, negotiation data (e.g., bids, selected and/or non-selected options for the transaction), and so forth. In one or more embodiments, the digital certificate 120 can be associated with the document 125 in various ways, including embedding the digital certificate into the document, combining data of the digital certificate with data of the document, and so forth.

In one or more embodiments, the digital certificate 120 includes information enabling access to stored information that is associated with the transaction and/or authentication, and to allow a user to keep track of who is accessing the document. As an example, the digital certificate 120 can be a matrix barcode that can be electronically read to provide a trace or address back to a storage vault that contains the stored information, such as one or more of authentication and/or transaction time, location of device utilizing in the authentication and/or transaction, and biometric data including the actual voice print used for authentication, the recorded user input, a portion of a voice print model used in the voice print match, and so forth. The digital certificate can also contain "user defined" access control information for enabling access to the stored information. As an example, certain information access requires only a "simple acknowledgement" where messages are sent to the user's device, and in others, full voice biometric authentication of the creator for permission to access document is required.

System 100 enables digitally representing a user's will during electronic transactions such as over the internet. System 100 can employ one or more of transaction monitoring for a user (e.g., constant monitoring), a dynamic multi-factored authentication component, traceability of the authentication and/or transaction, and/or document control after release (e.g., selective access, expiration timer).

One or more of the exemplary embodiments can utilize a single factor authentication process where the user input is obtained from the same end user device that is performing the transaction. For instance, a user may attempt to purchase a product via his or her mobile phone and may provide the user input (speech) via the mobile phone in response to a voice call received at the mobile phone. In this example, a digital certificate 120 can be generated and utilized for authenticating the transaction. The digital certificate 120 can be provided to one or both of the mobile phone and a third party server from which the purchase is sought.

System 100 illustrates a server 130 that can be a separate device from the communication devices 108 and 116. The server 130 can be managed by an entity that sells products or services or otherwise facilitates the sale of products or services (e.g., an auction website). In one or more embodiments, the server 130 can be managed by a service provider that provides users with access to media services, such as voice, video, data and/or messaging. In this example, an alert or other notification can be provided to the service provider responsive to an access request or access attempt with respect to information associated with the transaction and/or the authentication. For instance, when a request to access the authentication data is generated by a device (e.g., the user's device, a device associated with a party to the transaction, and so forth) via reading an embedded matrix barcode (the digital certificate 120) in a transaction record 125, a notification can be provided to the server 130 (or another service provider device). In one or more embodiments, the notification enables the service provider to allow or deny access to the stored authentication and/or transaction information.

In one or more of the exemplary embodiments, the personal avatar 162 can be resident on or otherwise executed by the communication device 108 or 116 or another end user device of the user. For instance, a user can have a first device, such as a desktop computer or a residential gateway) which executes the personal avatar 162 and which monitors for transactions by the user on any of the user's devices. This first device can communicate with a second device of the user to request user input (e.g., prompting speech of a second set of randomly selected sentences) for the multi-factor authentication process (e.g., a voice print analysis based on a first set of sentences that were used to train the avatar 162).

Figure 2:
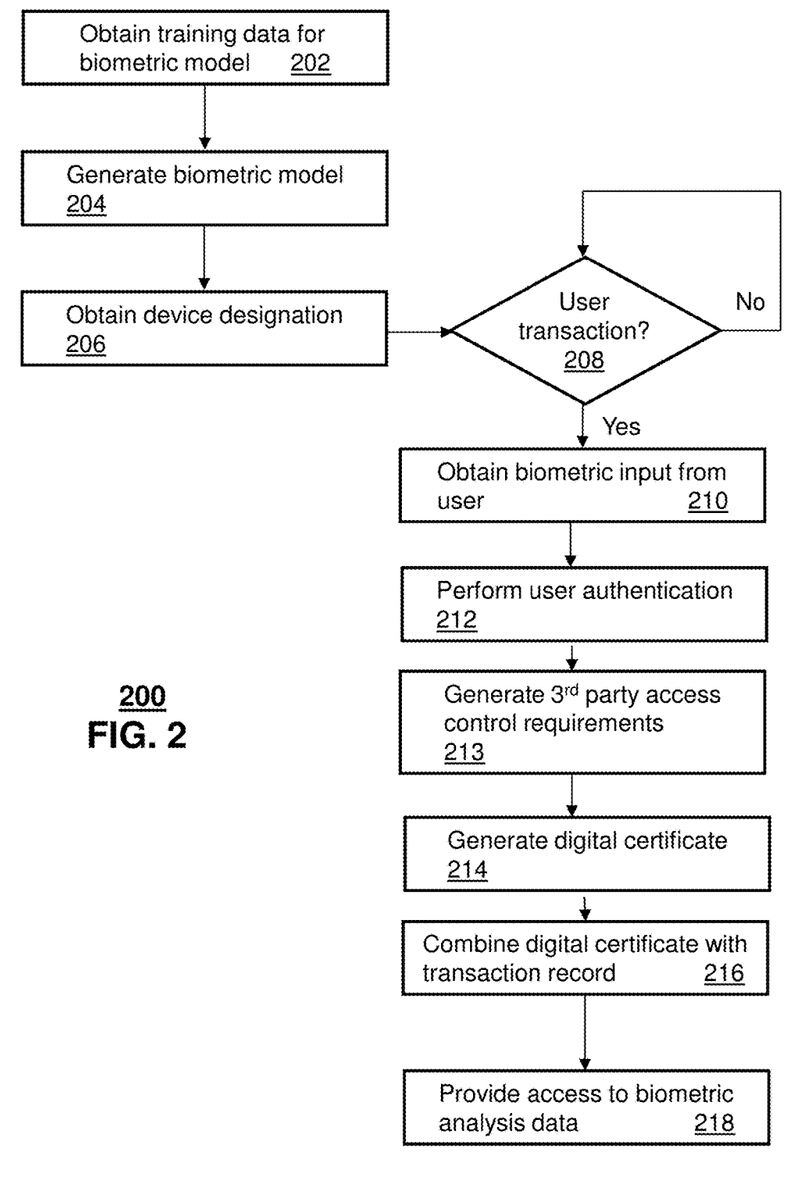
FIG. 2 depicts an illustrative embodiment of a method used in portions of the system described in FIG. 1.

FIG. 2 depicts an illustrative embodiment of a method 200 used for authentication of transactions through a multi-factored voice biometric verification. Method 200 can be performed in whole or in part by one or more of the devices illustrated in system 100. Method 200 can begin at 202 with obtaining training data and then at 204 a biometric model can be generated from the training data. For example, a voice print model for a user can be generated based on recording or otherwise capturing a first set of words or sentences spoken by the user. At 206, a communication device(s) of the user can be designated for use with authentication of transactions of the user. The designation can be by the user or by someone else. The designated communication device can be any type of device capable of obtaining user input (e.g., user speech) utilized in a biometric analysis.

At 208, monitoring can be performed for transactions of the user that require or can be facilitated by authentication. If such a transaction is detected or otherwise determined then at 210, a request for a biometric input via the designated communication device can be transmitted. For example, a voice call can be established between the server 130 and the designated communication device 116 in which a prompt (e.g., a synthesized speech request) is provided for the user to speak a second set of words or sentences via the communication device. At 212, a biometric analysis can be performed by comparing the biometric model with the received user input. For instance, the server 130 can obtain speech of the second set of sentences and compare the speech to a voice print model previously generated for the user. In this example, the voice analysis is based on different sets of sentences in the user input and in the voice print model.

At 213, the user is prompted or otherwise provides instructions which results in an "instruction flag" being embedded into the digital certificate, where the instruction flag provides for how the identity avatar responds to future requests to access information on the current transaction. For example, the instruction flag can provide for a request to the identity avatar to call back to the creator to ask for permission to access the document, or just simply log the data request event into the data vault.

At 214, a digital certificate 120 can be generated or otherwise issued responsive to an authentication of the user. At 216, the digital certificate 120 can be associated with a transaction record 125 for the transaction. For example, the digital certificate 120 can be a matrix barcode providing a link to an address that stores information for the transaction and/or the authentication. The matrix bar code can be embedded or otherwise added to the transaction record. The digital certificate then can act as a "pad lock" to the underlying information it is embedded into. At 218, the user, another party to the transaction or a third party can selectively access the information for the transaction and/or the authentication. The selective access can be controlled in a number of different ways, such as based on an expiration timer, based on an identity of the entity requesting access, and so forth.

In one embodiment, the server 130 can store the user input, time information for the receiving of the user input, identification information for the communication device of the user being utilized for the transaction, and/or location information for the authentication communication device when the user input was received. The server 130 can receive a request for an authentication verification associated with the transaction and can provide selective access to the user input, the time information, the identification information, the location information and/or data representative of the biometric (e.g., voice) analysis responsive to the request for the authentication verification.

In one embodiment, the server 130 can provide a timer with the digital certificate 120, where access to the transaction record (and the underlying document that it is embedded into) is limited to a time period associated with the timer. In one embodiment, the server 130 can receive an access message responsive to the transaction record 125 being accessed. In one embodiment, the server 130 can provide a request for the user to speak the first set of words, where the transaction associated with the user is via a different communication device of the user than is being used for the authentication. In one embodiment, the transaction can be a purchase of a product or service, and the digital certificate 120 can include a link for accessing data representative of the voice analysis. The user is notified of the third party product or service processing the transaction as these services notifies the identity avatar of the on-going transaction.

Figure 3:
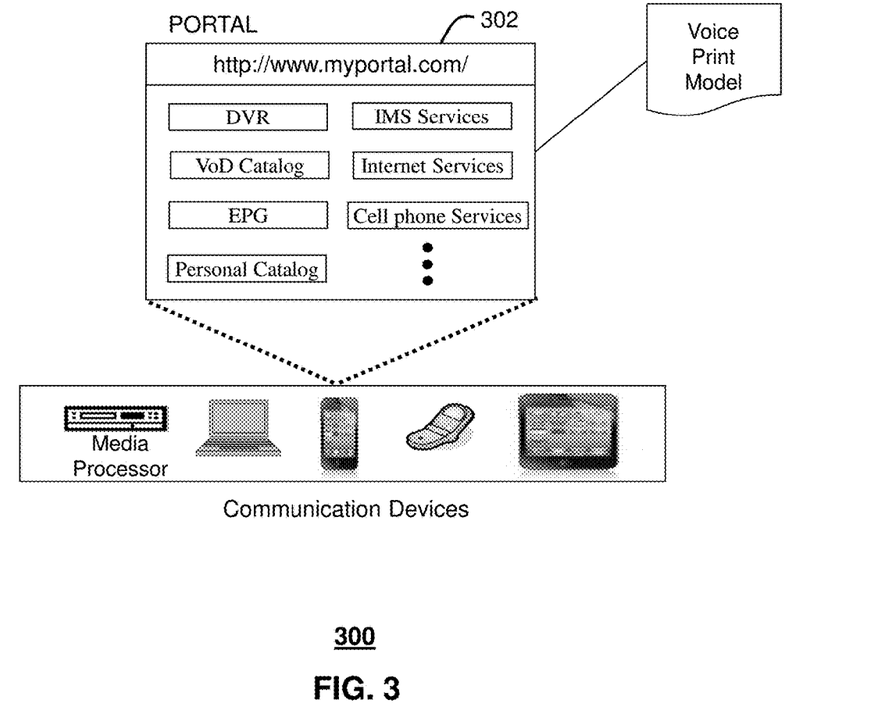
FIG. 3 depicts an illustrative embodiment of a web portal for interacting with the communication system of FIG. 1 for training of a biometric model and for accessing biometric analysis data.

FIG. 3 depicts an illustrative embodiment of a web portal 302 of a communication system 300. Communication system 300 can be overlaid or operably coupled with system 100 of FIG. 1 as another representative embodiment. The web portal 302 can be used for managing services of system 100 including providing first user input to enable training of the personal avatar 162 and generating of the biometric model (e.g., voice print model) for the user. As an example, a user via communication device 108 can access the web portal to provision the personal avatar 162. The provisioning can be of a personal avatar 162 resident of the server 130 and/or resident on one or more other devices, including end user device or other devices managed by the user (e.g., a residential gateway). The provisioning can be a training of the personal avatar 162 so that the biometric model (e.g., voice print model) can be generated for the user. For instance, the user can be prompted to speak several sentences which are then utilized by the personal avatar 162 into generate the voice print model.

A web page of the web portal 302 can be accessed by a Uniform Resource Locator (URL) with an Internet browser using an Internet-capable communication device such as those described in system 100. The web portal 302 can be configured, for example, to access a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor. The web portal 302 can also be used for provisioning IMS services described earlier, provisioning Internet services, provisioning cellular phone services, and so on. In one embodiment, the web portal 302 can be utilized by the user for adjusting the authentication process. For example, a user can change the designated communication device used for multi-factor authentication or switch from a single designated device to multiple designated devices (e.g., selected for the authentication request based on presence information). In one embodiment, the user can further adjust the authentication process by changing the biometric inputs. For instance, a user can select between voice print analysis and facial recognition for the biometric analysis. Other user preferences can also be provisioned to the personal avatar 162 via the web portal 302. In one embodiment, the web portal 302 can be used by a user or another entity for accessing the stored transaction and/or authentication information that is linked to the digital certificate 120. For instance, a scan of a matrix barcode (the digital certificate 120 in this example) can be performed and the access information that is extracted via the scan can be used for locating the stored information (e.g., stored at a remote storage device).

Figure 4:
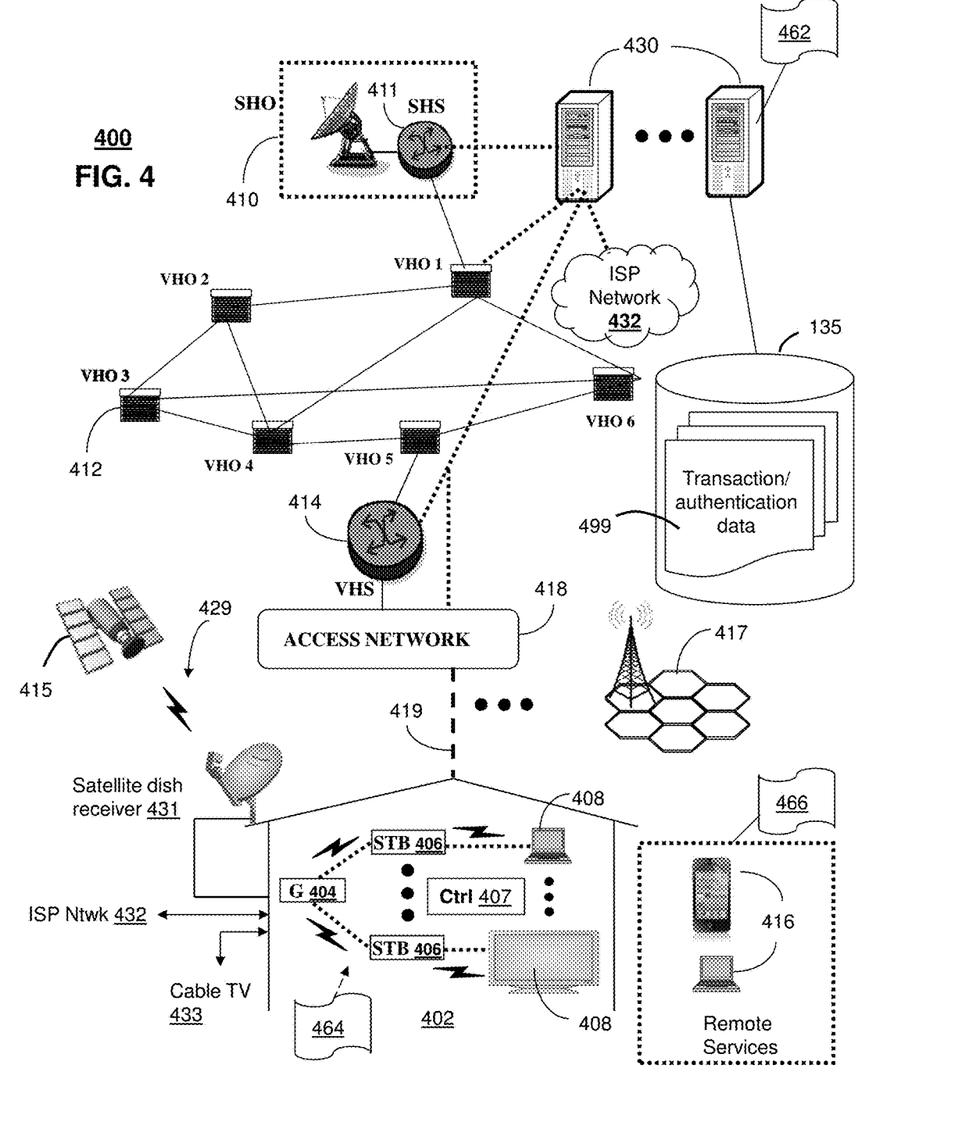
FIG. 4 depicts an illustrative embodiment of a communication system that provides media services including authentication by way of a multi-factored biometric verification.

FIG. 4 depicts an illustrative embodiment of a communication system 400 for delivering media services including access to content. The communication system 400 can represent an Internet Protocol Television (IPTV) media system. Communication system 400 can be overlaid or operably coupled with system 100 of FIG. 1 as another representative embodiment of communication system 400. For instance, one or more devices illustrated in the communication system 400 of FIG. 4 can receive a prompt for first user input to enable a server to generate and store a biometric model (e.g., a voice print model) for a user, such as where the prompt is for a first set of words to be spoken by the user. The one or more devices can receive the first user input and can provide the first user input to the server. The one or more devices can engage in a communication session for a transaction associated with the user. The engaging in the communication session can cause the server to provide a request for the user to provide second user input via a second communication device, such as where the second user input includes a second set of words spoken by the user. The engaging in the communication session can cause the server to perform a biometric analysis (e.g., a voice analysis) by comparing the second user input with the voice print model for authentication of the user. The one or more devices can receive access to a transaction record 125 for the transaction, where the transaction record includes a digital certificate 120 generated by the server responsive to the authentication, and where the digital certificate enables access to data representative of the biometric analysis (e.g., the voice analysis).

System 400 provides for dynamic digital signatures. System 400 can prevent or reduce the likelihood that a digital signature will be copied and re-used in an authentication process. For instance, the voice biometric analysis which requires the user to speak each time to authenticate each transaction avoids unauthorized copying of digital signatures. System 400 further provides for tracking and logging of the digital signatures so that their authenticity is much stronger than static digital signatures. For example, the personal avatar 162 after performing a multi-factored biometric verification, can store all or some of the biometric data used for authentication, and can issue or otherwise generate a digital certificate 120 to the user to be included into the signed document 125. The digital certificate 120 enables tracing back from the digital certificate to examine all or some of the data used for authentication. In one embodiment of system 400, the digital signatures can be time sensitive and can expire. For instance, the digital certificate 120 can control the access to the signed document 125. In this example, an entity cannot access or view the transaction document 125 if the timer has expired on the digital certificate 120.

System 400 also enables various media services to be utilized in conjunction with the multi-factor authentication process. The IPTV media system can include a super headend office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a personal avatar server (herein referred to as server 430). The server 430 can use computing and communication technology to perform function 462, which can include among other things, providing a request for first user input to enable generating a biometric model for a user, storing the biometric model, obtaining a designation of a communication device of the user for use with authentication of transactions of the user, and detecting a transaction associated with the user. Function 462 can also include providing a request for the user to provide second user input via the communication device responsive to the detecting of the transaction, receiving the second user input via the communication device, performing a biometric analysis by comparing the second user input with the biometric model for authentication of the user, generating a digital certificate responsive to the authentication, associating the digital certificate with a transaction record for the transaction, receiving a request for an authentication verification associated with the transaction, and providing access to data representative of the biometric analysis responsive to the request for the authentication verification.

For instance, function 462 of server 430 can be similar to the functions described for server 130 of FIG. 1 in accordance with method 200 and can include generating the digital certificates 120 that enable access to the transaction and/or authentication information 499. The media processors 406 and wireless communication devices 416 can be provisioned with software functions 464 and 464, respectively, to utilize the services of server 430. For instance, functions 464 and 466 of media processors 406 and wireless communication devices 416 can be similar to the functions described for the communication devices 108 and 116 of FIG. 1 in accordance with method 200.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

One or more of the exemplary embodiments can utilize an IP Multimedia Subsystem (IMS) network architecture to facilitate the combined services of circuit-switched and packet-switched systems.

Figure 5:
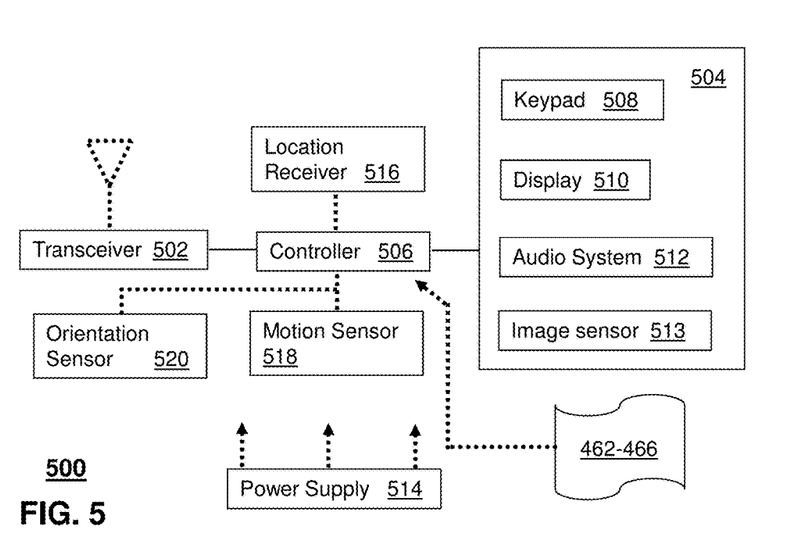
FIG. 5 depicts an illustrative embodiment of a communication device that can be used in multi-factored biometric verifications.

FIG. 5 depicts an illustrative embodiment of a communication device 500. Communication device 500 can serve in whole or in part as an illustrative embodiment of the devices depicted in FIGS. 1 and 3-4 and can be configured to perform portions of method 200 of FIG. 2. For example, communication device 500 can execute the personal avatar 162 by storing a voice print model for a user that is generated based on recording a first set of words spoken by the user, receiving a designation of a communication device of the user for use with authentication of transactions of the user, and providing a request for the user to speak a second set of words via the communication device responsive to detecting a transaction associated with the user. Communication device 500 can receive user input representative of the second set of words via the communication device, perform a voice analysis by comparing the user input with the voice print model for authentication of the user, generate a digital certificate responsive to the authentication, and associate the digital certificate with a transaction record for the transaction.

In another embodiment, communication device 500 can receive, from a server, a prompt for first user input to enable the server to generate and store a voice print model for a user, where the prompt is for a first set of words to be spoken by the user. Communication device 500 can receive the first user input and can provide the first user input to the server. Communication device 500 can engage in a communication session for a transaction associated with the user, where the engaging in the communication session causes the server to provide a request for the user to provide second user input via a second communication device, where the second user input comprises a second set of words spoken by the user, and where the engaging in the communication session causes the server to perform a voice analysis by comparing the second user input with the voice print model for authentication of the user. Communication device 500 can receive access to a transaction record for the transaction, where the transaction record includes a digital certificate generated by the server responsive to the authentication, and wherein the digital certificate enables access to data representative of the voice analysis.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of the devices of FIG. 1 and/or 3, the media processor 406, the media devices 408, and/or the portable communication devices 416 of FIG. 4. It will be appreciated that the communication device 500 can also represent other devices that can operate in systems 100 and 300, and/or communication system 400 such as a gaming console and a media player. In addition, the controller 506 can be adapted in various embodiments to perform the functions 462-466.

Upon reviewing the aforementioned embodiments, it would be evident to an artisan with ordinary skill in the art that said embodiments can be modified, reduced, or enhanced without departing from the scope of the claims described below. For example, the digital certificate (e.g., a matrix barcode) which enables access to relevant information for the authentication and/or transaction can be generated based on other authentication techniques which may or may not be multi-factor and which may or may not utilize biometric data. In one or more embodiment, the type of biometric data that is utilized for the authentication can be changed according to the effectiveness of the authentication process, such as detecting a threshold number of failed authentication attempts.

In one or more embodiments, the authentication process can be performed from another device of the user, such as a residential gateway, a desktop computer, a set top box and so forth, which monitors for user transactions and provides a prompt at a designated communication device of the user (e.g., a mobile phone) to obtain biometric input (speech of a second set of words) that is utilized in a biometric analysis. In this example, the biometric analysis can be performed by the user device or can be performed by another device (e.g., a network server) that has access to a biometric model (e.g. a voice print model) for the user.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
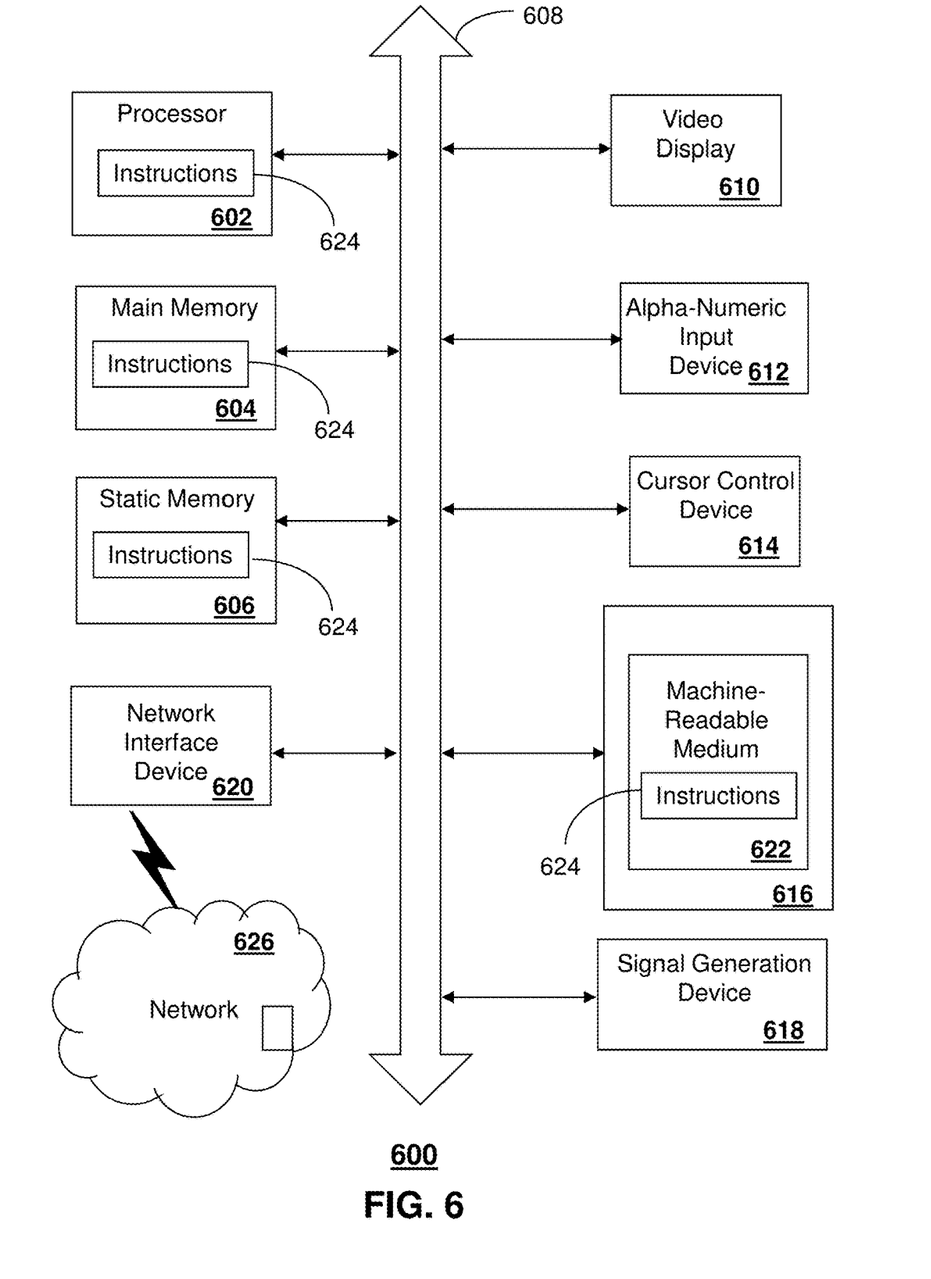
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the server 130, the devices 108 and 116 and other devices of FIGS. 1 and 3-5 to enable in whole or in part authentication of transactions through a multi-factored biometric verification. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    storing, by a system including a processor, an electronic voice print model associated with a user, the electronic voice print model generated based on recording words spoken by the user;
    receiving, by the system, a transaction record associated with a first device, the first device associated with a network address;
    determining, by the system, that the network address is associated with a biometric authentication;
    retrieving, by the system, a cellular telephone number registered for the biometric authentication, the cellular telephone number associated with a second device different from the first device;
    sending, by the system, separate biometric authentication requests to the second device associated with the cellular telephone number registered for the biometric authentication, a first biometric authentication request of the separate biometric authentication requests sent for authorizing a purchase transaction specified by the transaction record, and a second biometric authentication request of the separate biometric authentication requests sent for authorizing an access to the transaction record;
    receiving, by the system, separate voice recordings from the second device in response to the separate biometric authentication requests;
    performing, by the system, the biometric authentication based on comparisons of the separate voice recordings to the electronic voice print model; and
    generating, by the system, separate digital certificates responsive to the biometric authentication of the separate biometric authentication requests, a first digital certificate of the separate digital certificates documenting the authorizing of the purchase transaction and a second digital certificate of the separate digital certificates documenting the access to the transaction record.

2. The method of claim 1, further comprising randomly selecting a phrase for the separate biometric authentication requests.

3. The method of claim 2, further comprising specifying the phrase in at least one of the first biometric authentication request sent to the second device and the second biometric authentication request.

4. The method of claim 1, further comprising generating an expiration time associated with the second digital certificate, the expiration time defining a time of the access to the transaction record.

5. The method of claim 1, further comprising determining the transaction record via an Internet protocol.

6. The method of claim 1, further comprising determining the network address via an Internet protocol.

7. The method of claim 1, further comprising including a webpage link for accessing information associated with the transaction record.

8. A memory device storing instructions that, when executed by a server, facilitate performance of operations, the operations comprising:

storing an electronic voice print model associated with a user, the electronic voice print model generated based on a recording of words spoken by the user;

receiving a transaction record associated with a first device, the first device associated with a network address;

determining that the network address is associated with a multi-factor biometric authentication;

retrieving a cellular telephone number registered for the multi-factor biometric authentication, the cellular telephone number associated with a second device different from the first device;

sending a first biometric authentication request to the second device associated with the cellular telephone number registered for the multi-factor biometric authentication;

receiving a first voice recording sent from the second device associated with the cellular telephone number registered for the multi-factor biometric authentication, the first voice recording sent in response to the first biometric authentication request;

performing the multi-factor biometric authentication based on a first comparison of the first voice recording to the electronic voice print model;

creating a first digital certificate that authorizes the transaction record, the first digital certificate documenting the multi-factor biometric authentication obtained from the second device;

receiving an access request associated with the transaction record, the access request requesting an access to the transaction record;

sending a second biometric authentication request to the second device associated with the cellular telephone number registered for the multi-factor biometric authentication;

receiving a second voice recording sent from the second device associated with the cellular telephone number registered for the multi-factor biometric authentication, the second voice recording sent in response to the second biometric authentication request;

performing the multi-factor biometric authentication based on a second comparison of the second voice recording to the electronic voice print model; and creating a second digital certificate associated with the access request, the second digital certificate documenting the multi-factor biometric authentication based on the second comparison of the second voice recording to the electronic voice print model, the second digital certificate for accessing the transaction record.

9. The memory device of claim 8, wherein the operations further comprise randomly selecting a phrase for the recording.

10. The memory device of claim 9, wherein the first voice recording comprises a first phrase, wherein the second voice recording comprises a second phrase, and wherein the first phrase and the second phrase are different.

11. The memory device of claim 9, wherein the operations further comprise randomly selecting a phrase specified by the second biometric authentication request.

12. The memory device of claim 8, wherein the operations further comprise associating the first digital certificate with the transaction record.

13. The memory device of claim 8, wherein the operations further comprise including a webpage link for the accessing of the transaction record.

14. The memory device of claim 8, wherein the operations further comprise determining the transaction record via an Internet protocol.

15. A communication device, comprising:

a hardware processor; and a memory device, the memory device storing instructions, the instructions when executed by the hardware processor facilitate performance of operations, the operations comprising:

storing an electronic voice print model associated with a user, the electronic voice print model generated based on a recording of words spoken by the user;

receiving an Internet transaction record associated with a first device, the first device associated with a network address;

determining that the network address is associated with a multi-factor biometric authentication;

retrieving a cellular telephone number registered for the multi-factor biometric authentication, the cellular telephone number associated with a second device different from the first device;

initiating a first call to the second device associated with the cellular telephone number registered for the multi-factor biometric authentication, the first call for a first biometric authentication that authorizes the Internet transaction record associated with the first device;

receiving a first voice recording recorded during the call to the second device associated with the cellular telephone number registered for the multi-factor biometric authentication, the first voice recording recorded in response to the first biometric authentication of the Internet transaction record associated with the first device;

performing the multi-factor biometric authentication based on a first comparison of the first voice recording to the electronic voice print model;

creating a first digital certificate associated with the Internet transaction record associated with the first device, the first digital certificate documenting the first biometric authentication that authorizes the Internet transaction record based on the first voice recording recorded during the first call to the second device;

receiving an access request associated with the Internet transaction record, the access request requesting an access to the Internet transaction record;

sending a second biometric authentication request to the second device associated with the cellular telephone number registered for the multi-factor biometric authentication, the second biometric authentication request requesting a second biometric authentication that authorizes the access to the Internet transaction record;

receiving a second voice recording sent from the second device associated with the cellular telephone number registered for the multi-factor biometric authentication, the second voice recording sent in response to the second biometric authentication request to authorize the access to the Internet transaction record;

performing the multi-factor biometric authentication based on a second comparison of the second voice recording to the electronic voice print model; and creating a second digital certificate associated with the access request, the second digital certificate documenting the multi-factor biometric authentication based on the second voice recording sent from the second device.

16. The communication device of claim 15, wherein the operations further comprise determining the Internet transaction record via an Internet protocol.

17. The communication device of claim 15, wherein the operations further comprise randomly selecting a phrase for the first biometric authentication request.

18. The communication device of claim 15, wherein the operations further comprise randomly selecting a phrase for the second biometric authentication request.

19. The communication device of claim 15, wherein the operations further comprise including a link for accessing information associated with the Internet transaction record.

20. The communication device of claim 15, wherein the operations further comprising determining the network address via an Internet protocol.

* * * * *